United States Patent
Fujishiro (10) Patent No.: US 10,200,953 B2
(45) Date of Patent: Feb. 5, 2019

(54) RADIO TERMINAL, BASE STATION, AND PROCESSOR

(71) Applicant: KYOCERA CORPORATION, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/553,420

(22) PCT Filed: Feb. 25, 2016

(86) PCT No.: PCT/JP2016/055553
§ 371 (c)(1),
(2) Date: Aug. 24, 2017

(87) PCT Pub. No.: WO2016/136854
PCT Pub. Date: Sep. 1, 2016

(65) Prior Publication Data
US 2018/0249417 A1    Aug. 30, 2018

(30) Foreign Application Priority Data
Feb. 27, 2015    (JP) ................................. 2015-038162

(51) Int. Cl.
*H04W 24/10*    (2009.01)
*H04W 52/02*    (2009.01)
(Continued)

(52) U.S. Cl.
CPC ......... *H04W 52/0254* (2013.01); *H04W 4/70* (2018.02); *H04W 24/10* (2013.01);
(Continued)

(58) Field of Classification Search
CPC .. H04W 24/10; H04W 52/0254; H04W 76/28
See application file for complete search history.

(56) References Cited

U.S. PATENT DOCUMENTS

| 2010/0009643 | A1* | 1/2010 | Haartsen | H04W 52/0251 455/127.5 |
| 2012/0182896 | A1* | 7/2012 | Jang | H04W 24/10 370/252 |

(Continued)

FOREIGN PATENT DOCUMENTS

| JP | 2013-201508 A | 10/2013 |
| JP | 2014-514786 A | 6/2014 |

(Continued)

OTHER PUBLICATIONS

International Search Report issued in PCT/JP2016/055553; dated May 10, 2016.
(Continued)

*Primary Examiner* — Scott M Sciacca
(74) *Attorney, Agent, or Firm* — Studebaker & Brackett PC (57) ABSTRACT

A UE 100 performs, in a connected mode, measurement and measurement reporting on a downlink reference signal, based on "Measurement Config" received from a eNB 200. When the UE 100 has not received the "Measurement Config" from the eNB 200, the UE 100 transmits a measurement configuration request for requesting transmission of the "Measurement Config" to the eNB 200. The UE 100 receives the "Measurement Config" transmitted from the eNB 200 in response to the measurement configuration request.

18 Claims, 7 Drawing Sheets

(51) Int. Cl.
  *H04W 4/70* (2018.01)
  *H04W 76/28* (2018.01)
  *H04W 36/00* (2009.01)

(52) U.S. Cl.
  CPC ............ *H04W 76/28* (2018.02); *H04W 36/00* (2013.01); *H04W 52/0216* (2013.01); *Y02D 70/00* (2018.01); *Y02D 70/24* (2018.01)

(56) References Cited

U.S. PATENT DOCUMENTS

| | | | |
|---|---|---|---|
| 2012/0252471 A1 | 10/2012 | Futaki | |
| 2013/0005339 A1 | 1/2013 | Iwamura | |
| 2014/0155076 A1* | 6/2014 | Wang | H04W 48/12 455/450 |
| 2014/0247742 A1 | 9/2014 | Lee et al. | |
| 2014/0335870 A1* | 11/2014 | Yilmaz | H04W 36/32 455/441 |
| 2015/0215830 A1* | 7/2015 | Dalsgaard | H04W 36/0094 455/444 |

FOREIGN PATENT DOCUMENTS

| | | |
|---|---|---|
| JP | 2014-146865 A | 8/2014 |
| WO | 2011/083837 A1 | 7/2011 |

OTHER PUBLICATIONS

Qualcomm Incorporated; "New WI Proposal: RAN enhancements for extended DRX in LTE"; 3GPP TSG RAN Meeting #66; RP-141994; Dec. 8-11, 2014; pp. 1-6; Maui, Hawaii, USA.

Broadcom Corporation; "Mobility Improvement for Long DRX"; 3GPP TSG-RAN WG2 Meeting #85; R2-140423; Feb. 10-14, 2014; total 3 pages; Prague, Czech Republic.

* cited by examiner

CONVENTIONAL DRX CONFIGURATION INFORMATION

```
DRX-Config ::=                    CHOICE {
    release                           NULL,
    setup                             SEQUENCE {
        onDurationTimer                   ENUMERATED {
                                              psf1, psf2, psf3, psf4, psf5, psf6,
                                              psf8, psf10, psf20, psf30, psf40,
                                              psf50, psf60, psf80, psf100,
                                              psf200},
        drx-InactivityTimer               ENUMERATED {
                                              psf1, psf2, psf3, psf4, psf5, psf6,
                                              psf8, psf10, psf20, psf30, psf40,
                                              psf50, psf60, psf80, psf100,
                                              psf200, psf300, psf500, psf750,
                                              psf1280, psf1920, psf2560, psf0-v1020,
                                              spare9, spare8, spare7, spare6,
                                              spare5, spare4, spare3, spare2,
                                              spare1},
        drx-RetransmissionTimer           ENUMERATED {
                                              psf1, psf2, psf4, psf6, psf8, psf16,
                                              psf24, psf33},
        longDRX-CycleStartOffset          CHOICE {
            sf10                              INTEGER(0..9),
            sf20                              INTEGER(0..19),
            sf32                              INTEGER(0..31),
            sf40                              INTEGER(0..39),
            sf64                              INTEGER(0..63),
            sf80                              INTEGER(0..79),
            sf128                             INTEGER(0..127),
            sf160                             INTEGER(0..159),
            sf256                             INTEGER(0..255),
            sf320                             INTEGER(0..319),
            sf512                             INTEGER(0..511),
            sf640                             INTEGER(0..639),
            sf1024                            INTEGER(0..1023),
            sf1280                            INTEGER(0..1279),
            sf2048                            INTEGER(0..2047),
            sf2560                            INTEGER(0..2559)
        },
        shortDRX                          SEQUENCE {
            shortDRX-Cycle                    ENUMERATED {
                                                  sf2, sf5, sf8, sf10, sf16, sf20,
                                                  sf32, sf40, sf64, sf80, sf128, sf160,
                                                  sf256, sf320, sf512, sf640},
            drxShortCycleTimer                INTEGER (1..16)
        }   OPTIONAL                                            -- Need OR
    }
}

DRX-Config-v13xx ::=              SEQUENCE {
    ExtendedDRX                       SEQUENCE {
        extendedDRX-Cycle                 ENUMERATED {sf2560, ... , sf10240, ... }
    }
}
```

EXTENDED DRX CONFIGURATION INFORMATION

RADIO TERMINAL, BASE STATION, AND PROCESSOR

TECHNICAL FIELD

The present invention relates to a radio terminal, a base station, and a processor used in a mobile communication system.

BACKGROUND ART

In 3GPP (3rd Generation Partnership Project), which is a project aiming to standardize a mobile communication system, a discontinuous reception (DRX) is prescribed as an intermittent reception technique to reduce power consumption of a radio terminal. A radio terminal in a DRX state in a connected mode intermittently monitors a downlink control channel, based on DRX configuration information received from a base station. A cycle in which the downlink control channel is monitored is referred to as "DRX cycle". Furthermore, monitoring duration arising in each DRX cycle is referred to as "On duration".

In recent years, machine-type communication (MTC) in which a radio terminal performs communication without human intervention in a mobile communication system has attracted attention. From such a background, an ongoing discussion is a new introduction of an extended DRX cycle longer than a conventional DRX cycle to further reduce power consumption (for example, see Non Patent Document 1). The DRX using the extended DRX cycle is referred to as "extended DRX".

PRIOR ART DOCUMENT

Non-Patent Document

Non Patent Document 1; 3GPP contribution "RP-141994"

SUMMARY OF THE INVENTION

A radio terminal according to a first aspect performs, in a connected mode, measurement and measurement reporting on a downlink reference signal, based on measurement configuration information received from a base station. The radio terminal comprises a transmitter configured to transmit, to the base station, a measurement configuration request for requesting transmission of the measurement configuration information.

A base station according to a second aspect manages a cell. The base station comprises a receiver configured to receive a measurement configuration request for requesting transmission of measurement configuration information, from a radio terminal in a connected mode in the cell; and a transmitter configured to transmit, in response to the measurement configuration request, the measurement configuration information to the radio terminal. The measurement configuration information is information for the radio terminal to perform measurement and a measurement reporting on a downlink reference signal.

A processor according to a third aspect is used in a radio terminal that performs, in a connected mode, measurement and measurement reporting on a downlink reference signal, based on measurement configuration information received from a base station. The processor executes a process of transmitting, to the base station, a measurement configuration request for requesting transmission of the measurement configuration information.

DESCRIPTION OF EMBODIMENTS

[Overview of Embodiments]

A radio terminal in the connected mode measures a downlink reference signal for each cell based on measurement configuration information (Measurement Configuration) received from a base station and transmits the measurement report on the measurement result to the base station. The base station performs mobility control such as handover control based on the measurement report.

On the other hand, when the base station sets an extended DRX in the radio terminal, it is assumed that the base station considers the radio terminal as an MTC terminal, that is, a radio terminal not moving. In this case, there is a possibility that the base station does not transmit the measurement configuration information to the radio terminal. Also, due to other circumstances, the radio terminal may not be able to perform measurement and measurement reporting based on appropriate measurement configuration information.

Therefore, there is concern that appropriate mobility control can not be performed.

Therefore, the embodiments provide a radio terminal, a base station, and a processor that can realize appropriate mobility control.

A radio terminal according to embodiments performs, in a connected mode, measurement and measurement reporting on a downlink reference signal, based on measurement configuration information received from a base station. The radio terminal comprises a transmitter configured to transmit, to the base station, a measurement configuration request for requesting transmission of the measurement configuration information.

In the embodiments, the radio terminal further comprises a receiver configured to receive the measurement configuration information transmitted in response to the measurement configuration request, from the base station.

In the embodiments, the transmitter transmits the measurement configuration request to the base station, when the measurement configuration information is not received from the base station and when the measurement and the measurement reporting are determined to be necessary.

In the embodiments, in response to a value on a moving speed of the radio terminal exceeding a threshold value, the measurement and the measurement reporting are determined to be necessary.

In the embodiments, when the measurement configuration information is not received from the base station and being in an extended DRX state to discontinuously monitor a downlink control channel, the transmitter transmits, in response to the value on the moving speed exceeding the threshold value, the measurement configuration request, to the base station.

In the embodiments, the threshold value is set based on threshold value information received from the base station.

In the embodiments, the threshold value is set based on a DRX cycle in the extended DRX state.

In the embodiments, the threshold value is set based on at least one of cell size information indicating a size of a cell and a measurement value obtained by the measurement.

In the embodiments, the transmitter transmits, to the base station, together with the measurement configuration request, first information for the base station to decide a content of the measurement configuration information.

In the embodiments, the first information includes at least one of the content desired by the radio terminal and the value on the moving speed of the radio terminal.

In the embodiments, the transmitter transmits, to the base station, together with the measurement configuration request, second information for the base station to determine a change of a DRX configuration in the connected mode.

In the embodiments, the second information includes at least one of a request for configuration cancellation of the extended DRX state, a request for shortening of a DRX cycle, and the value on the moving speed of the radio terminal.

A base station according to the embodiments manages a cell. The base station comprises a receiver configured to receive a measurement configuration request for requesting transmission of measurement configuration information, from a radio terminal in a connected mode in the cell; and a transmitter configured to transmit, in response to the measurement configuration request, the measurement configuration information to the radio terminal. The measurement configuration information is information for the radio terminal to perform measurement and a measurement reporting on a downlink reference signal.

In the embodiments, the measurement configuration request is transmitted from the radio terminal when the measurement and the measurement reporting are determined to be necessary.

In the embodiments, in response to a value on a moving speed of the radio terminal exceeding a threshold value, the measurement and the measurement reporting are determined to be necessary.

In the embodiments, the transmitter transmits threshold value information to set the threshold value.

In the embodiments, the receiver receives, from the radio terminal, together with the measurement configuration request, first information for the base station to decide a content of the measurement configuration information.

In the embodiments, the first information includes at least one of the content desired by the radio terminal and the value on the moving speed of the radio terminal.

In the embodiments, the receiver receives, from the radio terminal, together with the measurement configuration request, second information for the base station to determine a change of a DRX configuration in the connected mode.

In the embodiments, the second information includes at least one of a request for configuration cancellation of an extended DRX state, a request for shortening of a DRX cycle, and the value on the moving speed of the radio terminal.

A processor according to the embodiments is used in a radio terminal that performs, in a connected mode, measurement and a measurement reporting on a downlink reference signal, based on measurement configuration information received from a base station. The processor executes a process of transmitting, to the base station, a measurement configuration request for requesting transmission of the measurement configuration information.

[Embodiments]

(Mobile Communication System)

Figure 1:
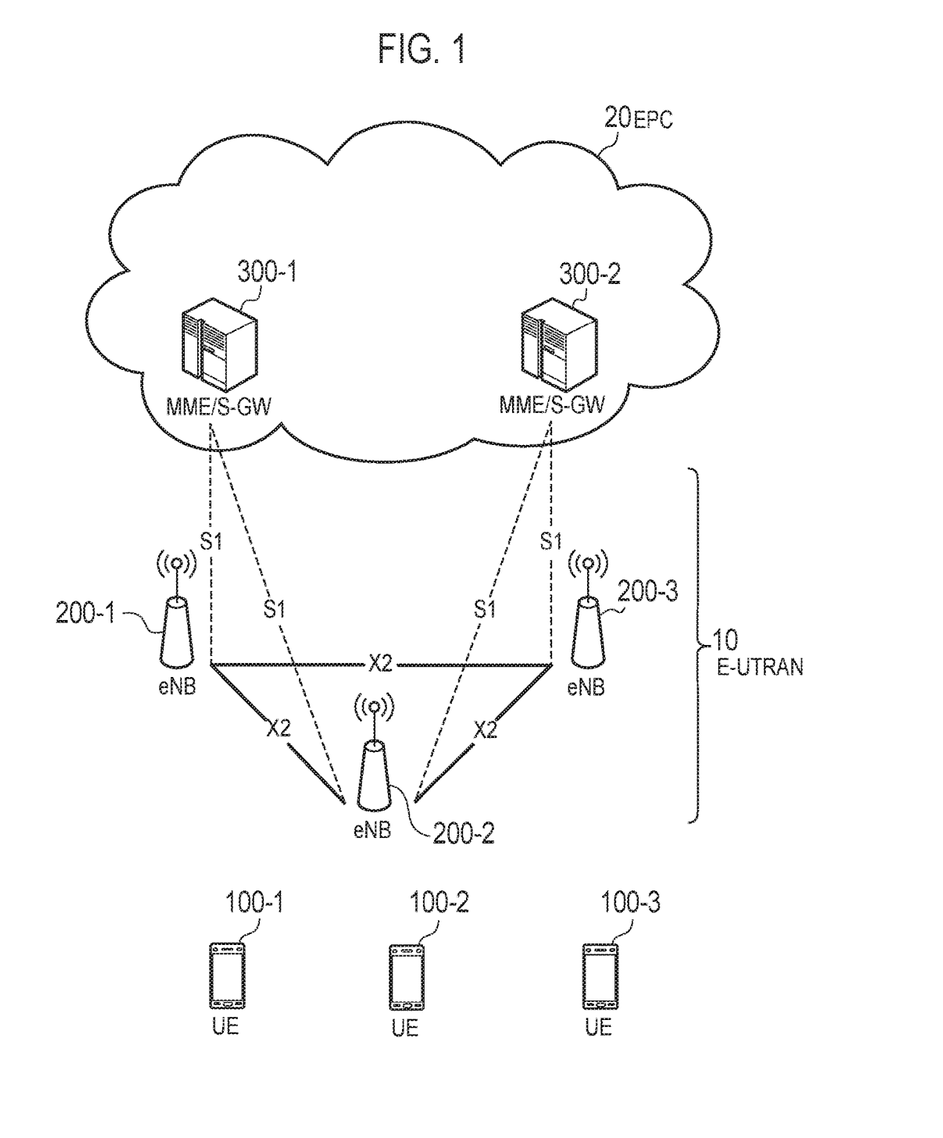
FIG. 1 is a configuration diagram of an LTE system according to an embodiment.

Hereinafter, an LTE system that is a mobile communication system according to embodiments will be described. FIG. 1 is a diagram illustrating a configuration of the LTE system.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a radio terminal. The UE 100 is a mobile communication device and performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/ S-GWs (Serving-Gateways) 300. The MME performs various mobility controls and the like for the UE 100. The S-GW performs control to transfer data. MME/S-GW 300 is connected to eNB 200 via an S1 interface. The E-UTRAN 10 and the EPC 20 constitute a network.

Figure 2:
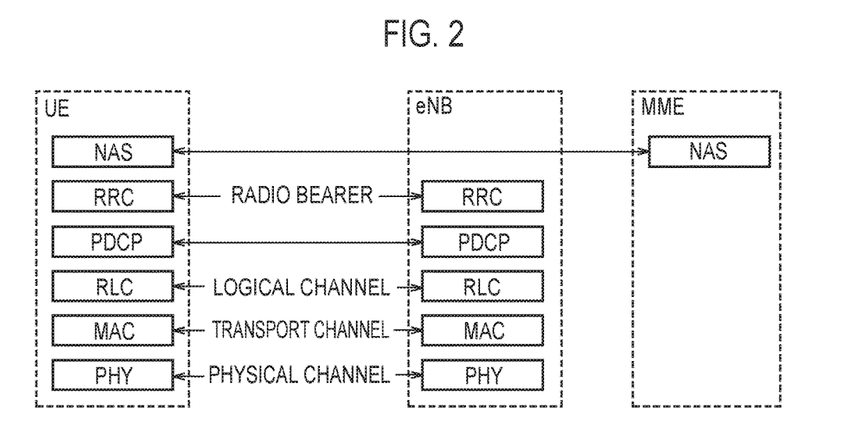
FIG. 2 is a protocol stack diagram of a radio interface according to the embodiment.

FIG. 2 is a protocol stack diagram of a radio interface in the LTE system. As illustrated in FIG. 2, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control signal are transmitted via the physical channel.

The MAC layer performs priority control of data, a retransmission process by hybrid ARQ (HARQ), and a random access procedure and the like. Between the MAC layer of the UE 100 and the MAC layer of the eNB 200, data and control signal are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected mode (connected mode), otherwise the UE 100 is in an RRC idle mode (idle mode).

A NAS (Non-Access Stratum) layer positioned above the RRC layer performs a session management, a mobility management and the like.

Figure 3:
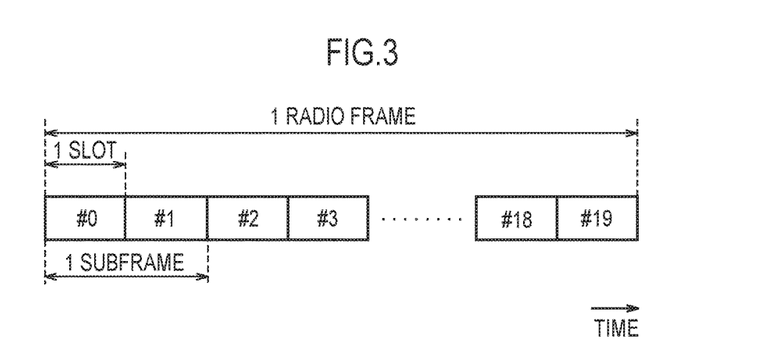
FIG. 3 is a configuration diagram of a radio frame according to the embodiment.

FIG. 3 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 3, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

In the downlink, a section of several symbols at the head of each subframe is a control region used as a physical downlink control channel (PDCCH) for mainly transmitting a control signal. The detail of the PDCCH will be described later. Furthermore, the other portion of each subframe is a region available as a physical downlink shared channel (PDSCH) for mainly transmitting downlink data.

In the uplink, both ends in the frequency direction of each subframe are control regions used as a physical uplink control channel (PUCCH) for mainly transmitting an uplink control signal. Furthermore, the other portion of each subframe is a region available as a physical uplink shared channel (PUSCH) for mainly transmitting uplink data.

(DRX in Connected Mode)

Figure 4:
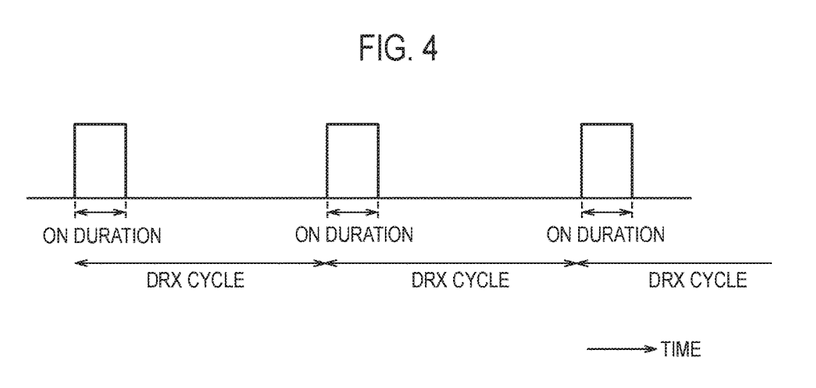
FIG. 4 is a diagram illustrating an operation of a UE in a DRX state in a connected mode.
Figure 5:
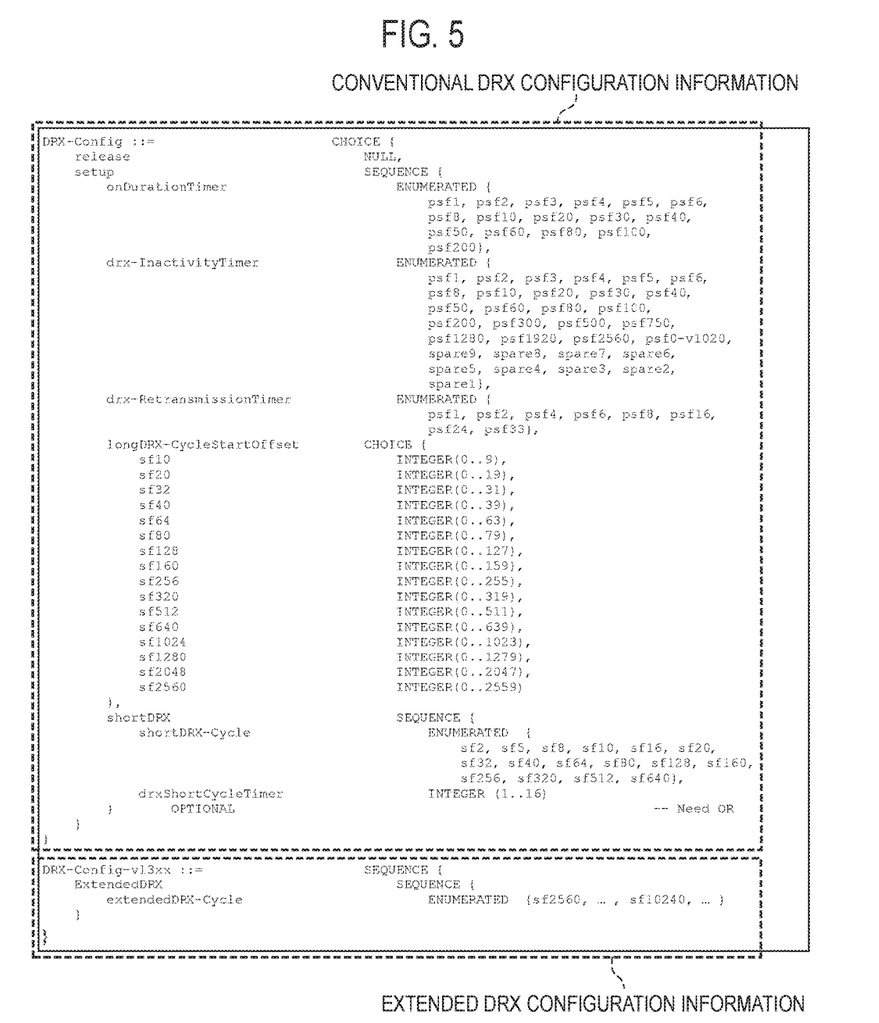
FIG. 5 is a diagram illustrating an example of a DRX parameter in the connected mode.

A DRX in the connected mode will be described, below. FIG. 4 is a diagram illustrating an operation of the UE 100 in a DRX state in the connected mode. FIG. 5 is a diagram illustrating an example of a DRX parameter in the connected mode.

As illustrated in FIG. 4, the UE 100 in the DRX state in the connected mode intermittently monitors the PDCCH. A cycle in which the PDCCH is monitored is referred to as "DRX cycle". Furthermore, monitoring duration arising in each DRX cycle is referred to as "On duration". The "On duration" is also referred to as "wake-up duration". A duration during which the PDCCH does not need to be monitored is also referred to as "sleep duration" (or "Opportunity for DRX").

Downlink data is transmitted via the PDSCH, and scheduling information of the PDSCH is included in the PDCCH. Upon detecting, in "On duration", scheduling information via the PDCCH, the UE 100 can receive data designated by the scheduling information.

As illustrated in FIG. 5, a conventional DRX cycle includes a short DRX cycle and a long DRX cycle. The duration length of the short DRX cycle and the duration length of the long DRX cycle are the same in "On duration", but different in the sleep duration. For example, the "On duration" can be set from 1 ms to 200 ms by an "On duration timer". The long DRX cycle (and offset time) is configured by "longDRX-CycleStartOffset", and the short DRX cycle is configured by "shortDRX-Cycle". It is noted that in the 3GPP specifications, if a DRX is configured, a long DRX is a mandatory function and a short DRX is an optional function. Therefore, even when the long DRX cycle is configured, the short DRX cycle is sometimes not configured in the UE 100.

The DRX is controlled based on a plurality of timers, as described below.

"drx-InactivityTimer": the number of consecutive subframes (PDCCH subframes) after correctly decoding the PDCCH indicating uplink (UL) or downlink (DL) user data scheduling "HARQ RTT Timer": the minimum number of subframes until DL HARQ retransmission is performed "drx-RetransmissionTimer": the duration used for retransmission Upon receiving new DL data while in "On duration", the UE 100 activates the "drx-InactivityTimer". Simultaneously, the "HARQ RTT Timer" is activated. If the DL data is not correctly decoded, the "drx-RetransmissionTimer" is activated at the same time the "HARQ RTT Timer" expires. If the DL data is correctly decoded, in response to the retransmission of DL data, the UE 100 stops the "drx-RetransmissionTimer". Then, the sleep duration is started at the same time the "drx-InactivityTimer" expires.

It is noted that a state in which the "On duration timer", the "drx-InactivityTimer", and the "drx-RetransmissionTimer" are in operation, is referred to as "Active state". In the "Active state", the UE 100 monitors the PDCCH. A DRX state which is not in the "Active state" is referred to as "Inactive state".

Next, a state transition between a short DRX state and a long DRX state will be described. Basically, the UE 100 starts from the short DRX and transitions to the long DRX state upon elapsing of a time duration set by a "drxShortCycleTimer".

At the time point when the DL data is correctly decoded, the UE 100 activates the "drxShortCycleTimer". If new data is received during the operation of the "drxShortCycleTimer", the UE 100 restarts the "drxShortCycleTimer" at the time point when the data is correctly decoded. Meanwhile, if new data is not received before the "drxShortCycleTimer" expires, state transition from the short DRX to the long DRX occurs. Then, if new data is received after the transition to the long DRX, state transition from the long DRX to the short DRX occurs again.

Configuration information (the "On duration", various types of timers, the long DRX cycle, the short DRX cycle, and the like) including each parameter of the DRX described above, is configured in the UE 100 by "DRX-Config", which is an information element in a dedicated RRC message.

In the embodiment, an extended DRX cycle longer than the conventional DRX cycle is newly introduced to support mainly machine-type communication (MTC). In the example of FIG. 5, the extended DRX cycle has a time length of 2560 or more subframes. If the eNB 200 configures the extended DRX in the UE 100, it is assumed that the eNB 200 considers the UE 100 as an MTC terminal, that is, a non-moving radio terminal.

The extended DRX is defined as an information element different from the conventional "DRX-Config". That is, "DRX-Config-v13xx", which is the configuration information of the extended DRX, is different from the "DRX-Config", which is the configuration information of the conventional DRX. The "DRXConfig-v13xx" may include parameters such as the "On duration" and various types of timers, separately from the "DRX-Config".

(Measurement and Measurement Reporting in Connected Mode)

A measurement and measurement reporting in the connected mode will be described, below.

Based on measurement configuration information (Measurement Config) received from the eNB 200, the UE 100 in the connected mode performs measurement of a downlink reference signal for each cell (Cell-specific Reference Signal (CRS)), and transmits, to the eNB 200, a measurement reporting about the measurement result. The measurement result is, for example, a reference signal received power (RSRP) and/or a reference signal received quality (RSRQ). Based on the measurement reporting, the eNB 200 performs mobility control such as handover control and the like.

The "Measurement Config" is an information element in the dedicated RRC message. The "Measurement Config" includes report configuration information (ReportConfig), a measurement object (MeasObject), and a measurement identifier (MeasId). The "ReportConfig" is used to configure a condition to transmit the "Measurement Report" from the UE 100 to the eNB 200. For example, according to a condition defined in Event-A3, if a measurement result for a neighboring cell has improved by an offset value or more than a measurement result for a current serving cell, the "Measurement Report" is transmitted. Furthermore, according to a condition defined in Event-A4, if the measurement result for a neighboring cell has improved more than a predetermined threshold value, the "Measurement Report" is transmitted. Moreover, according to a condition defined in Event-A2, if the measurement result for the current serving cell is equal to or less than the predetermined threshold value, the "Measurement Report" is transmitted. In addition, according to a condition defined in the "Periodical", the "Measurement Report" is transmitted by the "Measurement Report" with a predetermined reporting periodicity. The offset value, the predetermined threshold value, the predetermined reporting periodicity, the number of times of reporting, the type of reporting condition and the like are configured by the "ReportConfig".

The "MeasObject" is used to set a frequency and/or RAT (Radio Access Technology) to be measured by the UE 100. The "MeasId" is used for associating one "ReportConfig" with one "MeasObject". The UE 100 performs measurement on a measurement object designated by the "MeasObject" corresponding to the "MeasId", and if the "MeasId" satisfies a condition designated by the "ReportConfig" corresponding to the "MeasObject", the UE 100 transmits the "Measurement Report" to the eNB 200.

(Radio Terminal)

Figure 6:
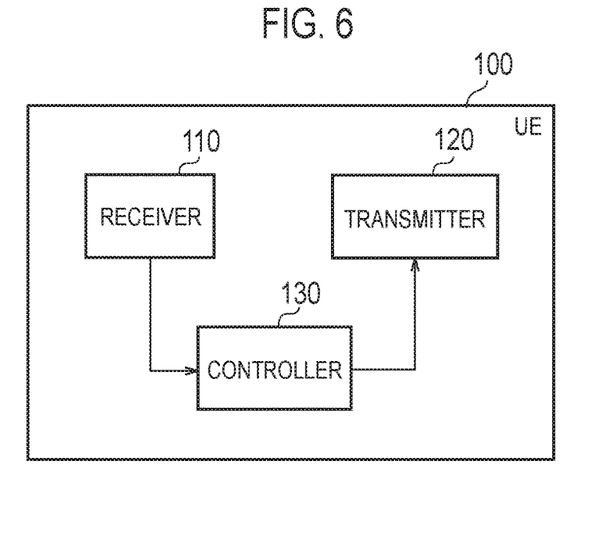
FIG. 6 is a block diagram of the UE according to the embodiment.

The UE 100 (radio terminal) according to the embodiments will be described below. FIG. 6 is a block diagram of a configuration of the UE 100. As illustrated in FIG. 6, the UE 100 includes a receiver 110, a transmitter 120, and a controller 130.

The receiver 110 performs various types of reception under the control of the controller 130. The receiver 110 includes an antenna and a receiving machine. The receiving machine converts a radio signal received by the antenna into a baseband signal (reception signal) and outputs it to the controller 130.

The transmitter 120 performs various types of transmission under the control of the controller 130. The transmitter 120 includes an antenna and a transmitting machine. The transmitting machine converts a baseband signal (transmission signal) output from the controller 130 into a radio signal and transmits it from the antenna.

The controller 130 performs various controls in the UE 100. The controller 130 includes a processor and a memory. The memory stores programs executed by the processor and information used for processing by the processor. The processor includes a baseband processor that performs modulation and demodulation of the baseband signal, performs encoding and decoding, and the like, and a CPU (Central Processing Unit) that executes various programs by executing a program stored in the memory. The processor may include a codec for encoding/decoding audio/video signals. The processor executes various processes described later and various communication protocols described above.

In the UE 100 thus configured, if the "Measurement Config" has not been received from the eNB 200 in the connected mode, the transmitter 120 transmits, to the eNB 200, in response to a value on the moving speed of the UE 100 exceeding a threshold value, a measurement configuration request for requesting transmission of the "Measurement Config". The receiver 110 receives the "Measurement Config" transmitted from the eNB 200 in response to the measurement configuration request.

If the UE 100 includes a GPS receiver unit, the value on the moving speed of the UE 100 is the moving speed obtained by using the GPS receiver unit. Alternatively, if the UE 100 includes an acceleration sensor, the value on the moving speed of the UE 100 may be the acceleration or the moving speed obtained by using the acceleration sensor. Alternatively, the value on the moving speed of the UE 100 may be the number of times of cell transitions (for example, the number of times of handovers) per unit time.

Furthermore, the threshold value to be compared with the value on the moving speed of the UE 100 is a preset threshold value. The preset threshold value may be zero or a value close to zero. Alternatively, the threshold value may be a value designated by the eNB 200. Alternatively, a value of the DRX cycle may be used as threshold value. Alternatively, the threshold value may be set based on at least one of: cell size information indicating the size of the cell (serving cell); and a measurement value obtained by the measurement. Hereinafter, such threshold value is referred to as "threshold value of the moving speed".

(Base Station)

Figure 7:
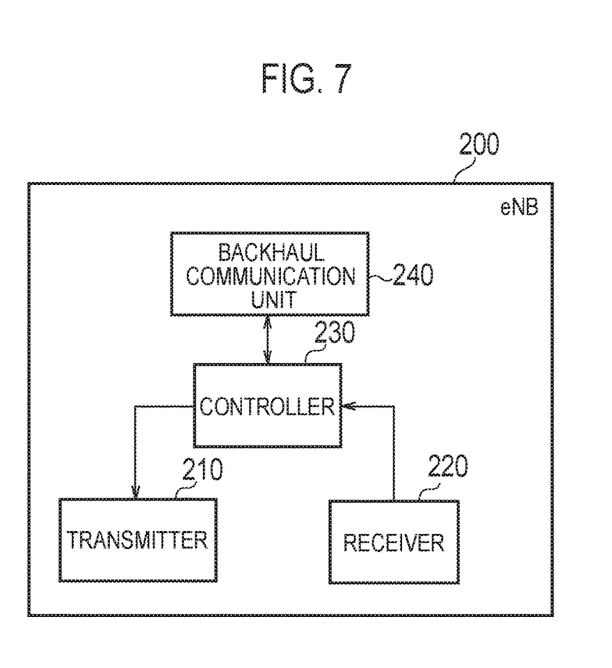
FIG. 7 is a block diagram of an eNB according to the embodiment.

The configuration of the eNB 200 (base station) will be described below. FIG. 7 is a block diagram of the eNB 200. As illustrated in FIG. 7, the eNB 200 includes a transmitter 210, a receiver 220, a controller 230, and a backhaul communication unit 240.

The transmitter 210 performs various transmissions under the control of the controller 230. The transmitter 210 includes an antenna and a transmitting machine. The transmitting machine converts a baseband signal (transmission signal) output from the controller 230 into a radio signal and transmits it from the antenna.

The receiver 220 performs various types of reception under the control of the controller 230. The receiver 220 includes an antenna and a receiving machine. The receiving machine converts a radio signal received by the antenna into a baseband signal (reception signal) and outputs it to the controller 230.

The controller 230 performs various controls in the eNB 200. The controller 230 includes a processor and a memory. The memory stores programs executed by the processor and information used for processing by the processor. The processor includes a baseband processor that performs modulation and demodulation of the baseband signal, performs encoding and decoding, and the like, and a CPU (Central Processing Unit) that executes various programs by executing a program stored in the memory. The processor executes various processes described later and various communication protocols described above.

The backhaul communication unit 240 is connected to an adjacent eNB 200 via the X2 interface, and is connected to the MME/S-GW 300 via an S1 interface. The backhaul communication unit 240 is used for communication performed on the X2 interface, communication performed on the S1 interface, and the like.

In the eNB 200 thus configured, the backhaul communication unit 240 receives an "Expected UE Behaviour IE" over the S1 interface. The "Expected UE Behaviour IE" includes an "Expected HO Interval", an "Expected Activity Period", an "Expected Idle Period", and a "source of ue activity behaviour information". The "Expected HO Interval" is an expected value of the handover interval of the UE 100. The "Expected Activity Period" is an expected value of the active period of the UE 100. The "Expected Idle Period" is an expected value of the idle period of the UE 100. The "source of ue activity behaviour information" is information on the calculation source (subscriber information or statistical information) of the expected values described above.

Based on the "Expected UE Behaviour IE", the controller 230 determines whether or not to configure the extended DRX in the UE 100. For example, the controller 230 determines, for a non-moving UE 100, to configure the extended DRX, and transmits configuration information for the extended DRX to the UE 100. Furthermore, based on the "Expected UE Behaviour IE", the controller 230 determines whether or not to configure the measurement and the measurement reporting in the UE 100. For example, the controller 230 determines, for a non-moving UE 100, to not configure the measurement and the measurement reporting. Thus, power consumption of a UE 100 determined as non-moving, is reduced. It should be noted that the measurement and the measurement reporting are normally configured in the UE 100 in the connected mode.

In the embodiment, the receiver 220 receives, from the UE 100 in the connected mode in the cell of the UE 100, a measurement configuration request for requesting transmission of "Measurement Config". In response to the measurement configuration request, the transmitter 210 transmits the "Measurement Config" to the UE 100. The measurement configuration request is transmitted from the UE 100, in response to the value on the moving speed of the UE 100 exceeding the threshold value.

(Operation Sequence)

Figure 8:
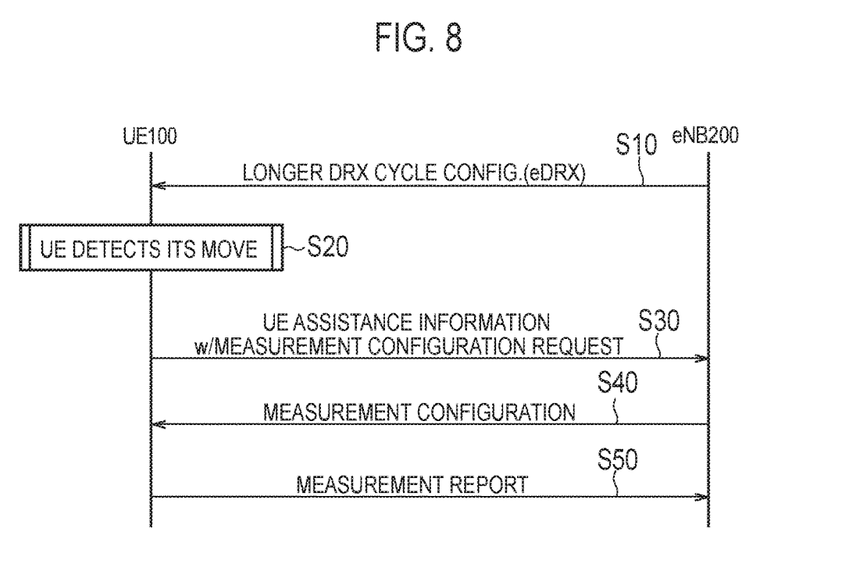
FIG. 8 is a diagram illustrating an operation sequence according to the embodiment.

An operation sequence according to the embodiment will be described, below. FIG. 8 is a diagram illustrating the operation sequence according to the embodiment. The UE 100 is in the connected mode in the cell of the eNB 200.

As illustrated in FIG. 8, in step S10, the transmitter 210 of the eNB 200 transmits configuration information of the extended DRX (here, referred to as "eDRX Config"), to the UE 100. The receiver 110 of the UE 100 receives the "eDRX Config". The controller 130 of the UE 100 retains the "eDRX Config" and transitions to an extended DRX state based on the "eDRX Config".

However, the UE 100 has not received the "Measurement Config". Therefore, the UE 100 cannot perform measurement and measurement reporting.

In step S20, the controller 130 of the UE 100 determines whether or not the value of the moving speed of the UE 100 exceeds the threshold value of the moving speed, and detects that the value on the moving speed of the UE 100 has exceeded the threshold value of the moving speed.

In step S30, in response to the value on the moving speed of the UE 100 exceeding the threshold value of the moving speed, the transmitter 120 of the UE 100 transmits, to the eNB 200, a measurement configuration request for requesting transmission of the "Measurement Config". Here, an example is illustrated in which the measurement configuration request is transmitted by a "UE Assistance information" message. The receiver 220 of the eNB 200 receives the "UE Assistance information" message including the measurement configuration request.

In step S40, in response to reception of the measurement configuration request, the transmitter 210 of the eNB 200 transmits, to the UE 100, the "Measurement Config" (Measurement Configuration) that is the measurement configuration information. The receiver 110 of the UE 100 receives the "Measurement Config". The controller 130 of the UE 100 retains the "Measurement Config" and starts measurement based on the "Measurement Config".

As a result of the measurement, the controller 130 of the UE 100 determines whether or not a reporting condition indicating a condition for transmitting the "Measurement Report" to the eNB 200 is satisfied. As described above, the reporting condition is designated by the "ReportConfig" in the "Measurement Config". Here, a description will be given on the assumption that the reporting condition is satisfied. The transmitter 120 of the UE 100 transmits, to the eNB 200, a scheduling request for receiving allocation of uplink radio resources for transmitting the "Measurement Report". The receiver 220 of the eNB 200 receives the "Scheduling Request". After transmitting the "Scheduling Request" to the eNB 200, the controller 130 of the UE 100 stops the extended DRX state. The controller 130 of the UE 100 may stop the extended DRX state and transition to a predetermined DRX state having a shorter DRX cycle than the extended DRX state. The predetermined DRX state is, for example, a long DRX state. In response to reception of the "Scheduling Request", the controller 230 of the eNB 200 allocates uplink radio resources to the UE 100. The transmitter 210 of the eNB 200 transmits, to the UE 100, scheduling information (UL Grant) indicating allocated resources. The receiver 110 of the UE 100 receives the "UL Grant".

In step S50, the transmitter 120 of the UE 100 transmits a "Measurement Report" to the eNB 200. The receiver 220 of the eNB 200 receives the "Measurement Report". Based on the "Measurement Report", the controller 230 of the eNB 200 determines whether or not to hand over the UE 100 to another cell. Here, a description will be given on the assumption that it is determined to hand over the UE 100 to another cell. The transmitter 210 of the eNB 200 transmits, to the UE 100, an instruction for handover to another cell (Handover Command). The receiver 110 of the UE 100 receives the "Handover Command". Based on the "Handover Command", the controller 130 of the UE 100 performs handover to another cell.

(Summary of Embodiment)

If the value on the moving speed of the UE 100 exceeds the threshold value of the moving speed, the UE 100 in the connected mode not having the "Measurement Config" transmits a measurement configuration request to the eNB 200. In response to reception of the measurement configuration request, the eNB 200 transmits the "Measurement Config" to the UE 100. Therefore, it is possible to realize appropriate mobility control.

[First Modification of Embodiment]

In the operation sequence described above, it is assumed that the threshold value of the moving speed is preset. However, the threshold value of the moving speed may be set by the eNB 200.

In the present modification, the transmitter 210 of the eNB 200 transmits, to the UE 100, threshold value information indicating the threshold value of the moving speed. The receiver 110 of the UE 100 receives the threshold value information. The controller 130 of the UE 100 sets the threshold value of the moving speed, in accordance with the threshold value information.

The threshold value information may be transmitted, as a type of system information, by a broadcast RRC message (SIB). Alternatively, the threshold value information may be transmitted by an dedicated RRC message. In this case, the threshold value information may be transmitted in step S10 or step S20.

Figure 9A:
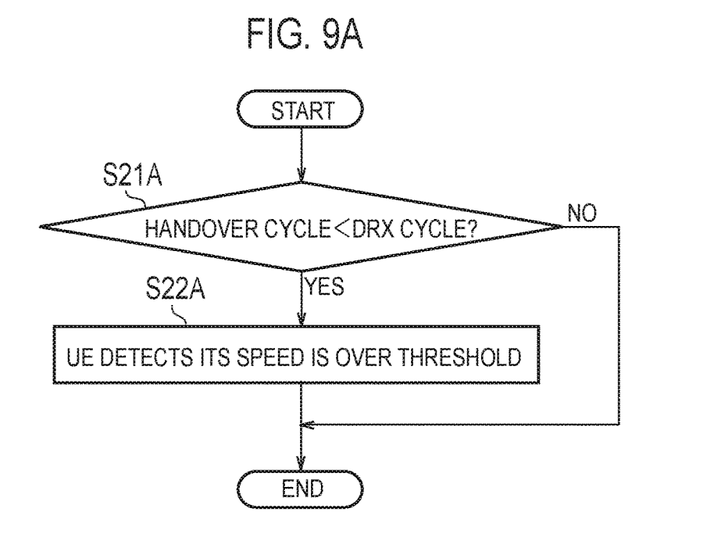
FIG. 9 is a flowchart illustrating a moving speed determination method according to a first modification of the embodiment.

Next, another example for a moving speed determination method (step S20 in FIG. 8) will be described. FIG. 9(A) is a flowchart illustrating a moving speed determination method 1 according to the present modification. In the moving speed determination method 1, the threshold value of the moving speed is set based on the DRX cycle.

As illustrated in FIG. 9A, in step S21A, the controller 130 of the UE 100 compares: a handover cycle, that is the time (average time) elapsed from the execution of one handover to the execution of the next handover; with the currently used DRX cycle (that is, the extended DRX cycle). Here, the "Handover cycle" corresponds to the value on the moving speed of the UE 100.

If the DRX cycle is larger than the "Handover cycle" (in step S21A: Yes), in step S22A, the controller 130 of the UE 100 detects that the value on the moving speed of the UE 100 exceeds the threshold value of the moving speed.

Figure 9B:
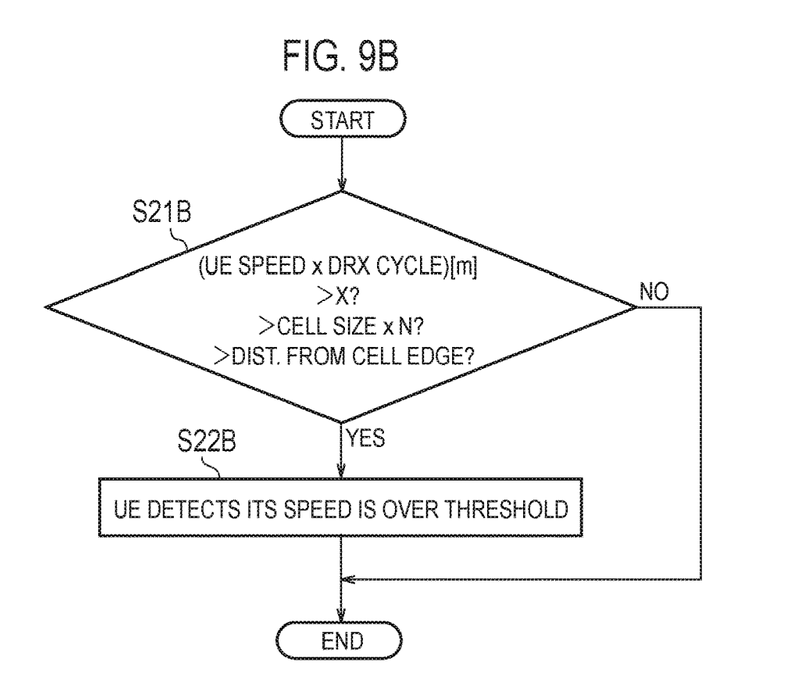

FIG. 9B is a flowchart illustrating a moving speed determination method 2 according to the present modification. In the moving speed determination method 2, the threshold value of the moving speed is set based on at least one of: cell size information indicating a size of the serving cell; and a measurement value obtained by the measurement.

As illustrated in FIG. 9B, in step S21B, the controller 130 of the UE 100 compares the threshold value of the moving speed to a value obtained by multiplying the moving speed of the UE 100 by the currently used DRX cycle (that is, the extended DRX cycle). Such multiplication value corresponds to a moving distance per 1 DRX cycle. Furthermore, the threshold value of the moving speed is set based on the size of the serving cell or a measurement value (RSRP/RSRQ measurement value). The cell size information is transmitted from, for example, the serving cell. A value obtained by multiplying the cell size information by a predetermined coefficient (N) may be used as the threshold value of the moving speed. From the RSRP/RSRQ measurement value, the distance to the cell edge can be estimated, and the distance to the cell edge is set as the threshold value of the moving speed. Alternatively, a preset value (X) may be set as threshold value of the moving speed.

If "Yes" in step S21B, in step S22B, the controller 130 of the UE 100 detects that the value on the moving speed of the UE 100 exceeds the threshold value of the moving speed.

Thus, according to the present modification, the UE 100 can transmit the measurement configuration request to the eNB 200 in a situation where the moving speed of the UE 100 is considered high by taking into consideration the currently used DRX cycle.

[Second Modification of Embodiment]

In the present modification, the transmitter 120 of the UE 100 transmits, to the eNB 200, together with the measurement configuration request, first information for the eNB 200 to decide the content of the "Measurement Config". The measurement configuration request and the first information may be included in one "UE Assistance information" message. The receiver 220 of the eNB 200 receives, from the UE 100, together with the measurement configuration request, the first information for the eNB 200 to decide the content of the "Measurement Config".

The first information includes at least one of: the content of the "Measurement Config" desired by the UE 100; and the value on the moving speed of the UE 100. The content of the "Measurement Config" desired by the UE 100 may also be TTT (Time To Trigger) described later. Based on the first information, the eNB 200 decides the content of the "Measurement Config" and transmits the "Measurement Config" to the UE 100. Therefore, it is possible to configure appropriate measurement and measurement reporting in the UE 100.

[Third Modification of Embodiment]

In the present modification, the transmitter 120 of the UE 100 transmits, to the eNB 200, together with the measurement configuration request, second information for the eNB 200 to determine a change of a DRX configuration. The measurement configuration request and the second information may be included in one "UE Assistance information" message. The receiver 220 of the eNB 200 receives, together with the measurement configuration request, the second information from the UE 100.

The second information includes at least one of: a request for configuration cancellation of the extended DRX state; a request for shortening of the DRX cycle; and the value on the moving speed of the UE 100. Based on the second information, the eNB 200 decides to change the DRX configuration (for example, cancellation of the extended DRX configuration and/or shortening of the DRX cycle), and transmits the changed DRX configuration information to the UE 100. Therefore, it is possible to configure an appropriate DRX in the UE 100.

[Fourth Modification of Embodiment]

In the present modification, the UE 100 performs the following operation upon reception of the "Measurement Config". The controller 130 of the UE 100 changes the reporting condition (ReportConfig) in accordance with the value on the moving speed of the UE 100. Specifically, the reporting condition (ReportConfig) is changed so that the reporting condition is attenuated and the transmission of the "Measurement Report" is accelerated.

For example, if the moving speed increases, the TTT (Time To Trigger) is set shorter, and if the moving speed decreases, the TTT is set longer. The TTT is duration during which a specific trigger condition (Event condition) should be satisfied. If control is performed as described above, the number of times of measurements can be minimized.

It is noted that a variable range (α) of the trigger condition may be set by the eNB 200. For example, if TTT±α (seconds) designated in the "ReportConfig" is set, the UE 100 varies α (seconds) depending on the moving speed of the UE 100. Alternatively, the eNB 200 may designate an upper limit and a lower limit of the trigger condition.

[Other Embodiments]

In the above-described embodiment, no particular distinction was made between intra-frequency measurement and inter-frequency measurement. The "Intra-frequency" measurement is measurement conducted in the same frequency as the frequency of the serving cell. The "Inter-frequency" measurement is conducted in a frequency different from the frequency of the serving cell.

However, if the "Measurement Config" for the "Intra-frequency" measurement has not been received from the eNB 200, the UE 100 in the connected mode may transmit, to the eNB 200, a measurement configuration request for requesting transmission of the "Measurement Config" for the "Intra-frequency" measurement.

Alternatively, if neither the "Measurement Config" for the "Intra-frequency" measurement, nor the "Measurement Config" for the "Inter-frequency" measurement have been received from the eNB 200, the UE 100 in the connected mode may transmit, to the eNB 200, a measurement configuration request for requesting transmission of "Measurement Config" for both the "Intra-frequency" and the "Inter-frequency" measurement.

In the above-described embodiment, the UE 100 transmits the measurement configuration request to the eNB 200, when measurement and measurement reporting for mobility control are determined to be necessary, depending on the movement state of the UE (particularly, the value on the moving speed).

However, information different from the value on the moving speed may be used as determination criteria for determining whether or not the measurement and measurement reporting for mobility control are necessary. For example, if the moving distance exceeds the threshold value, the UE 100 determines that the measurement and measurement reporting for mobility control are necessary and transmits the measurement configuration request to the eNB 200.

Alternatively, a radio state may be used as determination criteria. For example, if a variation amount of the received power (RSRP and the like) exceeds a predetermined amount, or if the received power becomes equal to or lower than a threshold value, the UE 100 determines that the measurement and measurement reporting for mobility control are necessary and transmits the measurement configuration request to the eNB 200.

Alternatively, a remaining amount of battery (or a connection status to a power source) may be used as determination criteria. For example, if a sufficient amount of battery remains (if the battery amount is equal to or higher than a fixed value, or if connected to a power source, the UE 100 transmits the measurement configuration request to the eNB 200.

Alternatively, an interest in another RAT may be used as determination criteria. For example, if a UE 100 supporting the LTE and GSM (registered trademark) is interested in GSM connection while being connected to LTE (for example, if it is determined that connecting to GSM is more advantageous in terms of power consumption), the UE 100 may transmit, to the eNB 200, a measurement configuration request for requesting transmission of "Measurement Config" for the "Intra-frequency" measurement (in particular, measurement of another RAT).

In the above-described embodiment, the UE 100 transmits the measurement configuration request to the eNB 200, if the "Measurement Config" has not been received from the eNB 200. However, the UE 100 may also transmit the measurement configuration request to the eNB 200, if the "Measurement Config" has been received in the past, but deleted (discarded). Alternatively, the UE 100 may transmit the measurement configuration request to the eNB 200, if the "Measurement Config" has been received from the eNB 200, but is not configured (applied) since the information is not applicable or is inadequate for application.

In the above-described embodiment, an example for configuring the extended DRX in the UE 100 has been described. However, it is not always necessary to configure the extended DRX in the UE 100.

In the above-described embodiment, the LTE system has been exemplified as the mobile communication system. However, the present invention is not limited to the LTE system. The present invention may be applied to systems other than the LTE system.

[Cross Reference to Related Applications]

The entire content of Japanese Patent Application No. 2015-38162 (filed on Feb. 27, 2015) is incorporated in the present specification by reference.

INDUSTRIAL APPLICABILITY

The present invention is useful in the field of communication.

The invention claimed is:

1. A radio terminal comprising:
a controller configured to perform, in a connected mode, measurement and measurement reporting on a downlink reference signal, based on measurement configuration information received from a base station; and
a transmitter configured to transmit, to the base station, a measurement configuration request for requesting transmission of the measurement configuration information, wherein
the transmitter is configured to transmit the measurement configuration request to the base station in response to a value on a moving speed of the radio terminal exceeding a threshold value and the measurement configuration information being not received from the base station, and
the transmitter is further configured to transmit to the base station, together with the measurement configuration request, the value on the moving speed of the radio terminal.

2. The radio terminal according to claim 1, further comprising:
a receiver configured to receive the measurement configuration information transmitted in response to the measurement configuration request, from the base station.

3. The radio terminal according to claim 1, wherein
the transmitter is configured to transmit the measurement configuration request to the base station in response to the radio terminal being in an extended DRX state to discontinuously monitor a downlink control channel.

4. The radio terminal according to claim 1, wherein
the threshold value is set based on threshold value information received from the base station.

5. The radio terminal according claim 1, wherein
the threshold value is set based on a DRX cycle in the extended DRX state.

6. The radio terminal according to claim 1, wherein the threshold value is set based on at least one of cell size information indicating a size of a cell and a measurement value obtained by the measurement.

7. The radio terminal according to claim 1, wherein the transmitter transmits, to the base station, together with the measurement configuration request, first information for the base station to decide a content of the measurement configuration information.

8. The radio terminal according to claim 7, wherein the first information includes content desired by the radio terminal.

9. The radio terminal according to claim 1, wherein the transmitter transmits, to the base station, together with the measurement configuration request, second information for the base station to determine a change of a DRX configuration in the connected mode.

10. The radio terminal according to claim 9, wherein the second information includes at least one of a request for configuration cancellation of the extended DRX state, a request for shortening of a DRX cycle, and the value on the moving speed of the radio terminal.

11. The radio terminal according to claim 1, wherein the transmitter is configured to transmit the measurement configuration request to the base station in a case that an average time between a handover and a next handover of the radio terminal is less than a length of a DRX cycle currently used by the radio terminal.

12. A base station that manages a cell, comprising:
a receiver configured to receive a measurement configuration request for requesting transmission of measurement configuration information, from a radio terminal in a connected mode in the cell; and
a transmitter configured to transmit, in response to the measurement configuration request, the measurement configuration information to the radio terminal, wherein
the measurement configuration information is information for the radio terminal to perform measurement and a measurement reporting on a downlink reference signal,
the receiver is configured to receive the measurement configuration request from the radio terminal in response to a value on a moving speed of the radio terminal exceeding a threshold value and the measurement configuration information being not received by the radio terminal from the base station, and
the receiver is configured to receive from the radio terminal, together with the measurement configuration request, the value on the moving speed of the radio terminal.

13. The base station according to claim 12, wherein the transmitter transmits threshold value information to set the threshold value.

14. The base station according to claim 13, wherein the receiver receives, from the radio terminal, together with the measurement configuration request, first information for the base station to decide a content of the measurement configuration information.

15. The base station according to claim 14, wherein the first information includes content desired by the radio terminal.

16. The base station according to claim 12, wherein the receiver receives, from the radio terminal, together with the measurement configuration request, second information for the base station to determine a change of a DRX configuration in the connected mode.

17. The base station according to claim 16, wherein the second information includes at least one of a request for configuration cancellation of an extended DRX state, a request for shortening of a DRX cycle, and the value on the moving speed of the radio terminal.

18. A processor used in a radio terminal, comprising a memory, and configured to execute processes of
performing, in a connected mode, measurement and a measurement reporting on a downlink reference signal, based on measurement configuration information received from a base station;
transmitting, to the base station, a measurement configuration request for requesting transmission of the measurement configuration information, in response to a value on a moving speed of the radio terminal exceeding a threshold value and the measurement configuration information being not received from the base station; and
transmitting to the base station, together with the measurement configuration request, the value on the moving speed of the radio terminal.

* * * * *